United States Patent [19]
Jorgensen et al.

[11] Patent Number: 5,290,745
[45] Date of Patent: Mar. 1, 1994

[54] PROCESS FOR PRODUCING ETHYLENE POLYMERS HAVING REDUCED HEXANE EXTRACTABLE CONTENT

[75] Inventors: Robert J. Jorgensen, Belle Mead, N.J.; Elton D. Fowler, Victoria, Tex.; George L. Goeke, Belle Mead, N.J.

[73] Assignee: Union Carbide Chemicals & Plastics Technology Corporation, Danbury, Conn.

[21] Appl. No.: 926,633

[22] Filed: Aug. 10, 1992

[51] Int. Cl.$^5$ ............................................... C08F 4/654
[52] U.S. Cl. ...................... 502/109; 502/104; 502/120; 502/126; 502/134; 423/492; 526/125
[58] Field of Search .................. 502/9, 104, 120, 126, 502/134; 423/492

[56] References Cited

U.S. PATENT DOCUMENTS

| | | | |
|---|---|---|---|
| 3,989,881 | 11/1976 | Yamaguchi et al. | 502/126 X |
| 4,279,776 | 7/1981 | Shiga et al. | 502/126 X |
| 4,410,672 | 10/1983 | Inazawa | 502/134 X |
| 5,132,261 | 7/1992 | Murata et al. | 502/126 X |

OTHER PUBLICATIONS

Piotr Sobota et al., "Reaction of the [THFCl$_2$ Mg$_2$Ti]$_2$ Complex with Ketones", Bulletin de l'Academie Polonaise des Sciences, Serie des science chimiques, vol. XXV, No. 12, pp. 957–962, 1977, (no month available).

*Primary Examiner*—Patrick P. Garvin
*Attorney, Agent, or Firm*—S. H. Hegedus

[57] ABSTRACT

A catalyst system of the Ziegler-Natta type suitable for producing ethylene copolymers having a reduced hexane extractable content comprising (a) an organoaluminum component and (b) a titanium trichloride component which has been prepared by reducing titanium tetrachloride with magnesium metal.

26 Claims, No Drawings

PROCESS FOR PRODUCING ETHYLENE POLYMERS HAVING REDUCED HEXANE EXTRACTABLE CONTENT

FIELD OF THE INVENTION

This invention relates to a catalyst system of the Ziegler-Natta type suitable for producing ethylene polymers having a reduced hexane extractable content comprising (a) an organoaluminum component and (b) a titanium trichloride component which has been prepared by reducing titanium tetrachloride with magnesium metal.

BACKGROUND OF THE INVENTION

Titanium trichloride is a well known component of Ziegler-Natta catalyst systems. The titanium trichloride employed in such systems is commercially available and most commonly produced by the reduction of titanium tetrachloride with aluminum metal. While catalysts employing titanium trichloride produced in this manner are extremely active, such catalysts have been found to promote the production of blocky resins having undesirably elevated levels of extractables and volatile oils when employed in the copolymerization of ethylene with higher alpha-olefins such as hexane. The cause of this high level of extractables and volatile oils is believed by the inventors herein to be attributable, at least in part, to the presence in such catalysts of a mixed crystal, $TiCl_3 \cdot \frac{1}{3}AlCl_3$, which is known to be produced when titanium tetrachloride is reduced with aluminum metal.

Titanium trichloride suitable for use in Ziegler-Natta catalyst systems can also be prepared by the reduction of titanium tetrachloride with hydrogen gas. However, this method is extremely costly and results in the production of an environmentally undesirable by-product, i.e., hydrogen chloride.

Still another method of producing titanium trichloride is by reducing titanium tetrachloride with an organomagnesium compound such as a dialkylmagnesium compound or an alkyl magnesium halide. However, this method also is extremely costly and, like the hydrogen reduction method, results in the formation of undesirable reaction by-products, in this case chlorinated alkanes, which must be separated from the desired titanium trichloride product before it can be used.

SUMMARY OF THE INVENTION

The present invention provides an improved method of reducing titanium tetrachloride to produce titanium trichloride which is free of undesirable by-products, and which can be employed together with an organoaluminum cocatalyst to copolymerize ethylene with higher alpha-olefins to produce ethylene copolymers having a reduced hexane extractable content, which method comprises treating titanium tetrachloride with a stoichiometric amount of magnesium metal required to reduce said titanium tetrachloride to titanium trichloride. According to this method, reduction of titanium tetrachloride to titanium trichloride takes place in an electron donor solvent and results in the formation of magnesium dichloride and titanium trichloride, which then form soluble complexes with the electron donor. Additional magnesium dichloride is then added to the solution to increase the Mg/Ti ratio to a desired level and complete formation of the desired catalyst component. The solution is then impregnated in a suitable support or, alternatively, spray dried with or without a suitable filler, to obtain discrete particles of the desired catalyst.

Thus, the present invention provides an improved catalyst system suitable for producing ethylene copolymers having a reduced hexane extractable content comprising (a) an organoaluminum component, and
(b) a titanium trichloride component prepared by (i) reducing titanium tetrachloride with magnesium metal by treating titanium tetrachloride in an electron donor solvent with a stoichiometric amount of magnesium metal required to reduce said titanium tetrachloride to titanium trichloride and produce magnesium dichloride; (ii) adding additional magnesium dichloride to the resulting solution to increase the Mg/Ti ratio to a desired level; and then (iii) impregnating said solution in a suitable support or, alternatively, spray drying the solution with or without a suitable filler, to obtain discrete particles of catalyst.

The catalyst system prepared in this manner is free of undesirable by-products and can be employed without further processing to copolymerize ethylene with higher alpha-olefins to produce ethylene copolymers having a reduced hexane extractable content. In addition to providing a catalyst system which is free of undesirable by-products, the invention provides a unique method of preparing said catalyst system whereby the titanium trichloride component is prepared in situ, i.e., without the necessity of producing and isolating this extremely corrosive, highly water-reactive, difficult to handle material. Thus, the invention provides a convenient means of preparing the catalyst which eliminates both the need for direct handling of titanium trichloride and the need to remove undesirable by-products from the catalyst.

DETAILED DESCRIPTION OF THE INVENTION

Reduction of titanium tetrachloride with magnesium metal according to the present invention takes place in an electron donor solvent and results in the formation of magnesium dichloride and titanium trichloride, which then form soluble complexes with the electron donor. The reaction which occurs when tetrahydrofuran (THF) is employed as solvent can be illustrated by the following equation:

$$Mg + 2\ TiCl_4 \xrightarrow{THF} MgCl_2(THF)_{1.5} + 2\ TiCl_3(THF)_3$$

The electron donor compound employed as solvent for the reaction is an organic compound which is liquid at 25° C. and in which the titanium tetrachloride employed, as well as the titanium trichloride and magnesium dichloride complexes produced, are soluble. The electron donor compound employed, however, must be free of radicals containing active hydrogen, such as alcohol radicals, as such radicals readily react with both magnesium and titanium tetrachloride. The electron donor compounds are sometimes also referred to as Lewis bases.

Suitable electron donor compounds include alkyl esters of aliphatic and aromatic carboxylic acids, aliphatic ethers, cycloaliphatic ethers and aliphatic ketones. Particularly useful are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 4 to 5 carbon atoms; cycloaliphatic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred electron donor is tetrahydrofuran. If desired, these electron donor compounds may be substituted with one or more substituents which are inert under the reaction conditions employed during reduction of the titanium tetrachloride and subsequent polymerization with the reduced product.

Because magnesium is highly reactive with titanium tetrachloride, it is preferable to employ the metal in granular form rather than as a powder. The use of larger granular particles of the metal rather than the more minute powder form limits the reactivity of the metal and allows the reaction to proceed in a smoother and more controlled manner. Proceeding in this manner also limits overreduction of titanium tetrachloride to titanium dichloride which might otherwise occur. Usually magnesium particles having an average particle size of from about 0.25 mm to about 10 mm, preferably from about 1 mm to about 4 mm, are employed.

Reduction of titanium tetrachloride to titanium trichloride is effected using an essentially stoichiometric amount of the magnesium metal required to effect the reduction, i.e., about one gram atom of magnesium metal is employed for every two moles of titanium tetrachloride. At least a stoichiometric amount of magnesium is required to completely reduce the titanium tetrachloride to titanium trichloride. On the other hand, an excess of magnesium is undesirable as such excess must then be removed from the reaction mixture. In addition, use of excess magnesium can cause overreduction of titanium tetrachloride to titanium dichloride.

Reduction of titanium tetrachloride with magnesium metal, as previously noted, is effected in an electron donor compound. About 5 mols to 400 mols of electron donor compound are advantageously employed per mol of titanium tetrachloride, preferably about 50 mols to 200 mols of electron donor compound per mol of titanium tetrachloride.

Usually the titanium tetrachloride is added to a mixture of the magnesium metal and electron donor compound, but it is also possible to add the magnesium metal to a solution of the titanium tetrachloride in the electron donor compound, or even to add the titanium tetrachloride and magnesium metal to the electron donor compound together. Ordinarily reaction is effected below the boiling point of the electron donor compound, preferably between 50° C. and 70° C. An inert atmosphere should be maintained, i.e., an atmosphere which is nonreactive under the conditions employed during reduction of the titanium tetrachloride with magnesium.

The reduction of titanium tetrachloride with magnesium metal results in a solution which contains one mole of magnesium dichloride for every two moles of titanium trichloride produced, and which is substantially free of undesirable by-products. In order to complete formation of the desired catalyst component, it is only necessary to add additional magnesium dichloride to the solution to increase the Mg/Ti ratio to the desired level. The solution can then be impregnated in a suitable support, or spray dried with or without a suitable filler, to obtain discrete particles of the desired catalyst.

The amount of magnesium dichloride added to the solution to increase the Mg/Ti ratio usually depends upon whether the solution is to be impregnated in a suitable support or spray dried. Because drying is not constrained to occur completely within the pores of a support when the solution is spray dried, higher amounts of magnesium dichloride are ordinarily employed when this procedure is followed than when the solution is impregnated in a support. Generally, sufficient magnesium dichloride is added to the solution to increase the Mg/Ti ratio to a range of from 1:1 to 56:1, preferably to a range of from 1.5:1 to 5:1. When the solution is to be spray dried, it is preferable to add sufficient magnesium dichloride to increase the Mg/Ti ratio to a range of from 1.5:1 to 15:1, most preferably to a range of from 4:1 to 6:1. On the other hand, when the solution is to be impregnated in a support, it is preferable to add sufficient magnesium dichloride to increase the Mg/Ti ratio to a range of from 1.5:1 to 10:1, most preferably to a range of from 2:1 to 5:1.

Dissolution of magnesium dichloride in the electron donor solution can be effected by stirring the magnesium dichloride in the electron donor solution at a temperature of from about 20° C. up to the boiling point of the electron donor compound. Because magnesium dichloride more readily dissolves in the electron donor compound in the presence of titanium tetrachloride than in the presence of titanium trichloride, in those instances when the titanium tetrachloride is to be reduced to titanium trichloride by adding the magnesium metal to a solution of the titanium tetrachloride in the electron donor compound, it may be preferable to dissolve both the magnesium dichloride and the titanium tetrachloride in the electron donor compound before the magnesium metal is added. The magnesium dichloride can, of course, also be dissolved in a mixture of the magnesium metal and electron donor compound before the titanium tetrachloride is added to the mixture, but there appears to be no special advantage in doing so.

The solution of titanium trichloride and magnesium dichloride prepared in this manner is then impregnated in a suitable support or, alternatively, spray dried with or without a suitable filler, to obtain discrete particles of the desired catalyst.

The impregnated or spray dried catalyst component prepared in this manner has the formula $$Mg_m TiCl_p [ED]_q$$

wherein
ED is an electron donor compound,
m is 1 to 56, preferably 1.5 to 5,
p is 5 to 115, preferably 6 to 13, and
q is 2 to 85, preferably 3 to 12.

The solution of titanium trichloride and magnesium dichloride in the electron donor compound may be impregnated in a suitable support by admixing the support with the solution and removing excess electron donor compound by drying at temperatures up to about 100° C.

The materials which can be employed as supports are solid, particulate, porous materials which are inert to the other components of the catalyst system, and during subsequent polymerization. Suitable support materials include inorganic materials such as oxides of silicon and/or aluminum. Usually these materials have an average particle size of from about 10 microns to about 250 microns, preferably from about 10 microns to about 150 microns, and a surface area of at least 3 square meters per gram, preferably at least 50 square meters per gram. Polymerization activity of the catalyst can be improved by employing a silica support having an average pore size of at least 80 Angstrom units, preferably at least 100 Angstrom units. The support material should be dry, that it, free of absorbed water. Drying of the support material can be effected by heating, e.g., at a temperature of at least 600° C. when silica is employed as the support. Alternatively, when silica is employed, it may be dried at a temperature of at least 200° C. and treated with about 1 weight percent to about 8 weight percent of one or more of the aluminum activator compounds described below. Modification of the support with an aluminum compound in this manner increases catalyst activity and improves the morphology of the resulting ethylene polymers. Other organometallic compounds, such as diethylzinc, may also be used to modify the support.

Suitably the impregnated support contains from about 3 percent by weight to about 50 percent by weight, preferably from about 10 percent by weight to about 30 percent by weight, of the Mg/Ti/ED catalyst component.

The solution of titanium trichloride and magnesium dichloride in the electron donor compound may be spray dried rather than impregnated in a support. Spray drying may be effected by admixing the solution with a suitable filler; optionally heating the resulting slurry to a temperature as high as the boiling point of the electron donor compound; and then atomizing the slurry by means of a suitable atomizing device to form discrete spherically shaped particles. Atomization is effected by passing the slurry through the atomizer together with an inert drying gas, i.e., a gas which is nonreactive under the conditions employed during atomization. An atomizing nozzle or a centrifugal high speed disc can be employed to effect atomization. The volumetric flow of drying gas must considerably exceed the volumetric flow of the slurry to effect atomization of the slurry and removal of excess electron donor compound. Ordinarily the drying gas is heated to a temperature greater than the boiling point of the electron donor compound to as high as about 160° C. to facilitate atomization of the slurry and removal of excess electron donor compound; however, if the volumetric flow of drying gas is maintained at a very high level, it is possible to employ temperatures below the boiling point of the electron donor compound. Atomization pressures of from about 1 psig to 200 psig are suitable.

Any solid particulate material which is inert to the other components of the catalyst system, and during subsequent polymerization, can be employed as filler for the solution of titanium trichloride and magnesium dichloride to form a slurry suitable for spray drying. Such materials can be organic or inorganic. Suitable fillers include silica, titanium dioxide, polystyrene, and calcium carbonate. Fumed hydrophobic silica is preferred because it imparts high viscosity to the slurry and good strength to the spray dried particles.

The particulate material employed as filler should have an average particle size no greater than 50 μm, preferably no greater than 10 μm. Like the particulate materials employed when the solution of titanium trichloride and magnesium dichloride is impregnated into a support, the particulate material employed as filler should be dry, i.e., free of absorbed water.

Sufficient filler should be admixed with the solution of titanium trichloride and magnesium dichloride to produce a slurry suitable for spray drying, i.e., a slurry containing such filler in an amount of from 0 percent by weight to about 15 percent by weight, preferably from about 2.5 percent by weight to about 10 percent by weight. When spray dried, such slurry produces discrete catalyst particles in which filler is present in an amount of from 0 percent by weight to about 50 percent by weight, preferably from about 10 percent by weight to about 30 percent by weight. The spray dried catalyst particles produced in this manner have an average particle size of from about 5 μm to about 200 μm, preferably from about 10 μm to about 30 μm.

To be useful in producing ethylene polymers, the impregnated or spray dried catalyst must be activated with a compound capable of transforming the titanium atoms in said catalyst to a state which will cause ethylene to effectively polymerize. Such activation is effected by means of an organoaluminum compound having the structure

$$AlR_dX_eH_f$$

wherein X is Cl or OR',

R and R' are saturated hydrocarbon radicals containing from 1 to 14 carbon atoms, which radicals may be the same or different, e is 0 to 1.5, f is 0 or 1, and d+e+f+3.

R and R' may be substituted with one or more substituents which are inert under the reaction conditions employed during polymerization. Preferably R and R' are alkyl radicals containing from 1 to 8 carbon atoms.

Such activator compounds can be employed individually or in combination thereof and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{17})_3$.

If desired, the impregnated or spray dried catalyst may be partially activated before it is introduced into the polymerization reactor. However, any activation undertaken outside of the polymerization reactor should be limited to the addition of an amount of activator compound which does not raise the molar ratio of activator compound:electron donor in the catalyst beyond 2:1, as higher ratios have been found to substantially lower catalyst activity. In order to maintain maximum catalyst activity, the activator compound is preferably employed in an amount which will provide the catalyst with an activator compound:electron donor molar ratio of from about 0.1:1 to about 1:1. Such partial activation may be carried out in a hydrocarbon solvent slurry followed by drying of the resulting mixture, to remove the solvent, at temperatures of from about 20° C. to about 80' C., preferably from about 50° C. to about 70° C. The resulting dried product can then be fed to the polymerization reactor where the activation is completed with additional activator compound, which can be the same or a different compound. Alternatively, the hydrocarbon slurry containing both the catalyst and activator may be fed directly to the reactor. Such slurries generally contain from 1 weight percent to 75 weight percent of catalyst and activator.

On the other hand, the impregnated or spray dried catalyst may, if desired, be completely activated in the polymerization reactor without any prior activation outside of the reactor, in the manner described in U.S. Pat. Nos. 4,383,095 and 4,376,062, the disclosures of which are incorporated herein by reference.

Polymerization is effected with the catalyst system of the present invention by contacting ethylene, or a mixture of ethylene and at least one alpha-olefin having 3 to 8 carbon atoms, with the two components of the catalyst system, i.e., the organoaluminum component and the titanium trichloride component. Polymerization can be effected employing either solution, slurry or gas phase techniques. Preferably, polymerization is effected in gas phase in a fluidized bed. Suitable fluid bed reaction systems useful for gas phase polymerizations are described, e.g., in U.S. Pat. Nos. 4,302,565, 4,302,566 and 4,303,771, the disclosures of which are incorporated herein by reference.

The partially activated or totally unactivated titanium trichloride catalyst component and the required amount of organoaluminum cocatalyst necessary to complete activation of this component are usually introduced into the reactor through separate feed lines in order to more effectively control the amount of each of these materials in the reactor. However, if desired, they can be added together. In any event, the organoaluminum cocatalyst and the titanium trichloride component are added to the reactor in such amounts as to provide, in the reactor, a total titanium:aluminum atomic ratio of from about 10:1 to about 400:1, preferably from about 15:1 to about 60:1.

The organoaluminum cocatalyst component may be introduced into the reactor dissolved in an inert liquid solvent, i.e., a solvent which is nonreactive under the conditions employed during polymerization. Hydrocarbons such as isopentane, hexane, heptane, toluene, xylene, naphtha and mineral oil are preferred for this purpose. Generally, such solutions contain from 5 weight percent to 75 weight percent of the organoaluminum cocatalyst. If desired, less concentrated or more concentrated solutions can be employed, or, alternatively, the organoaluminum cocatalyst can be added in the absence of solvent, or, if desired, suspended in a stream of liquid monomer. When a solvent is employed and polymerization is conducted in gas phase, the amount of solvent introduced into the reactor should be carefully controlled so as to avoid the use of excessive quantities of liquid which would interfere with such polymerization.

The solvents employed to dissolve the organoaluminum cocatalyst may also be employed to introduce the titanium trichloride component into the reactor. Higher boiling solvents, such as mineral oil, are preferred for this purpose. While the solid titanium trichloride component may also be introduced into the reactor in the absence of solvent or suspended in liquid monomer, such solvents may be employed to disperse the solid catalyst component and facilitate its flow into the reactor. Such dispersions generally contain from 1 weight percent to 75 weight percent of the solid catalyst component.

The alpha-olefins which may be polymerized with ethylene contain from 3 to 8 carbon atoms per molecule. These alpha-olefins should not contain any branching closer than two carbon atoms removed from the double bond. Suitable alpha-olefins include propylene, butene-1, pentene-1, hexene-1, 4-methyl-pentene-1, heptene-1 and octene-1. The preferred alpha-olefins include propylene, butene-1, hexene-1, 4-methyl-pentene-1 and octene-1.

The temperature employed during polymerization can vary from about 10° C. to about 115° C. when polymerization is effected in gas phase or in a slurry, and from about 150° C. to about 250° C. when polymerization is effected in solution. When polymerization is conducted in gas phase, the temperature, of course, must be maintained below the sintering temperature of the polymers produced in order to prevent polymer agglomeration. On the other hand, the temperature employed during gas phase polymerizations must be sufficiently elevated to prevent substantial condensation of the reaction mixture to the liquid state, as such condensation will cause the polymer particles being produced to cohere to each other and likewise aggravate the polymer agglomeration problem. This difficulty is normally associated with the use of alpha-olefins having 5 or more carbon atoms which have relatively high dew points. While some minor condensation is tolerable, anything beyond this will cause reactor fouling.

When polymers having a density of from 0.91 g/cm$^3$ to 0.97 g/cm$^3$ are desired, temperatures of from about 75° C. to about 115° C., preferably from about 75° C. to about 100° C., are usually employed. When producing polymers having a density of less than 0.91 g/cm$^3$, lower temperatures of from about 10° C. to about 80° C., preferably from about 40° C. to about 60° C., should be employed because of the lower sintering temperature of the product. In the later case, it is also necessary to dilute the reaction mixture with a large quantity of a diluent gas to prevent agglomeration and sustain polymerization on a continuous basis, as described in European patent specification 0 120 503, by Frederick John Karol et al.

The pressure employed can vary from subatmospheric to superatmospheric. Pressures of up to about 7000 kPa, preferably of from about 70 kPa to about 3500 kPa, are suitable for gas phase, slurry and solution polymerizations.

If desired, polymerization may be conducted in the presence of an inert gas, i.e., a gas which is nonreactive under the conditions employed during polymerization. A chain transfer agent, such as hydrogen, may also be present. The reactor should, however, be maintained substantially free of undesirable catalyst poisons, such as moisture, oxygen, carbon monoxide, carbon dioxide, acetylene, and the like.

When polymerization is conducted in a fluid bed, the superficial gas velocity of the gaseous reaction mixture through the bed must exceed the minimum flow required for fluidization in order to maintain a viable fluidized bed.

Copolymers of ethylene with higher alpha-olefins, such as hexane, produced with the catalyst system of the present invention have an n-hexane extractable content up to 50 percent lower than the n-hexane extractable content of copolymers produced with a like catalyst system employing a titanium trichloride component obtained by reducing titanium tetrachloride with aluminum instead of magnesium.

The following Examples are designed to illustrate the present invention and are not intended as a limitation upon the scope thereof.

The properties of the polymers produced in the Examples were determined by the following test methods:

Density

A plaque is made and conditioned according to ASTM D-1928, Procedure C. Density is then measured in a density gradient column according to ASTM D-1505. The result is reported in grams/cm$^3$.

Melt Index (MI)

ASTM D-1238, Condition E. Measured at 190° C. and reported as grams per 10 minutes.

Flow Index (FI)

ASTM D-1238, Condition F. Measured at 10 times the weight used in the melt index test above.

Melt Flow Ratio (MFR)

Ratio of Flow Index:Melt Index.

n-Hexane Extractables

A 200 square inch sample of 1.5 mil gauge film is cut into strips measuring 1"×61" and weighed to the nearest 0.1 mg. The strips are placed in a vessel and extracted with 300 ml. of n-hexane at 50±1° C. for 2 hours. The extract is then decanted into tared culture dishes previously weighed to the nearest 0.1 mg. After drying the extract in a vacuum desiccator the culture dishes are weighed to the nearest 0.1 mg. The extractables, normalized with respect to the original sample weight, is then reported as the weight fraction of n-hexane extractables.

Productivity

A sample of the resin product is ashed, and the weight percent of ash is determined. The amount of Ti in the ash is determined by elemental analysis. Productivity is expressed in terms of parts per million of Ti in the polymer.

Catalyst Particle Size

The terms D10, D50 and D90 indicate particular percentiles of log normal particle size distribution determined by means of a Leeds and Northrup Micro-trac particle size analyzer using a dodecane solvent. Thus, e.g., catalyst particles having a D50 of 12 μm have a median particle size of 12 μm. A D90 of 18 μm indicates that 90% of the particles have a particle size of less than 18 μm, and a D10 of 8 μm indicates that 10% of the particles have a particle size of less than 8 μm.

EXAMPLE 1

(a) Preparation of TiCl$_3$ Catalyst Component

The titanium trichloride catalyst component was prepared in a 1900 liter vessel equipped with pressure and temperature control, and a turbine agitator. A nitrogen atmosphere (<5 ppm H$_2$O) was maintained at all times.

Fourteen hundred eighty liters (1480 l) of anhydrous tetrahydrofuran (<40 ppm H$_2$O) were added to the vessel. The tetrahydrofuran was heated to a temperature of 50° C., and 1.7 kgs of granular magnesium metal (70.9 g. atoms) were added, followed by 27.2 kgs of titanium tetrachloride (137 mols). The magnesium metal had a particle size in the range of from 0.1 mm to 4 mm. The titanium tetrachloride was added over a period of about one-half hour.

The mixture was continuously agitated. The exotherm resulting from the addition of titanium tetrachloride caused the temperature of the mixture to rise to approximately 72° C. over a period of about three hours. The temperature was held at about 70° C. by heating for approximately another four hours. At the end of this time, 61.7 kgs of magnesium dichloride (540 mols) were added and heating was continued at 70° C. for another eight hours. The mixture was then filtered through a 100 μm micron filter to remove undissolved magnesium dichloride and unreacted magnesium (<0.5%).

(b) Spray Drying of TiCl$_3$ Catalyst Component

One hundred kilograms (100 kgs) of fumed silica having a particle size in the range of from 0.1 μm to 1 μm (CAB-O-SIL® TS-610, manufactured by the Cabot Corporation) were added to the solution prepared in accordance with Example 1(a) over a period of about two hours. The mixture was stirred by means of a turbine agitator during this time and for several hours thereafter to thoroughly disperse the silica in the solution. The temperature of the mixture was held at 70° C. throughout this period and a nitrogen atmosphere (<5 ppm H$_2$O) was maintained at all times.

The resulting slurry was spray dried using an 8-foot diameter closed cycle spray dryer equipped with a rotary atomizer. The rotary atomizer was adjusted to give catalyst particles with a D50 of 12 μm. The scrubber section of the spray dryer was maintained at approximately −4° C.

Nitrogen gas was introduced into the spray dryer at an inlet temperature of 140° C. and was circulated at a rate of approximately 1700 kg/hour. The catalyst slurry was fed to the spray dryer at a temperature of about 35° C. and a rate of 90–95 kg/hour, or sufficient to yield an outlet gas temperature of approximately 100° C. The atomization pressure was slightly above atmospheric.

The spray dried catalyst contained 2.5 wt. % Ti, 6.3 wt. % Mg and 29.2 wt. % THF. The particles had a D10 of 8μm, a D50 of 12 μm and a D90 of 18.6 μm, as determined by means of a Leeds and Northrup Microtrac particle size analyzer using a dodecane solvent.

(c) Partial Activation of TiCl$_3$ Catalyst Component

The discrete catalyst particles prepared in accordance with Example 1(b) were mixed with mineral oil under a nitrogen atmosphere in a 400 liter vessel equipped with a turbine agitator to form a slurry containing approximately 28 weight percent of the solid catalyst component. A 50 weight percent solution of tri-n-hexylaluminum in mineral oil was added and the slurry was stirred for one hour. The tri-n-hexylaluminum solution was employed in an amount sufficient to provide 0.2 mols of this compound per mol of tetrahydrofuran in the catalyst. A 30 weight percent solution of diethylaluminum chloride in mineral oil was then added and the slurry was stirred for another two hours. The diethylaluminum chloride solution was employed in an amount sufficient to provide 0.5 mols of this compound per mol of tetrahydrofuran in the catalyst.

(d) Copolymerization of Ethylene with Hexene-1

The catalyst slurry prepared as described in Example 1(c) was employed together with triethylaluminum, as cocatalyst, to copolymerize ethylene with hexene-1 in a large fluid bed reactor system similar to that described and illustrated in U.S. Pat. Nos. 4,302,565, 4,302,566 and 4,303,771.

The catalyst slurry was continually fed to the polymerization reactor along with a 10 percent by weight solution of the cocatalyst in isopentane.

Hydrogen was added to the reactor as a chain transfer agent to regulate the molecular weight of the polymer produced. Nitrogen was added as a diluent gas.

Table I below summarizes the reaction conditions employed during polymerization, the properties of the polymers produced, and the productivity of the catalyst system.

COMPARATIVE EXAMPLE A

This example illustrates the preparation and use of a catalyst system wherein the titanium trichloride component has been prepared by the reduction of titanium tetrachloride with aluminum rather than magnesium.

(a) Preparation of TiCl$_3$ Catalyst Component

The titanium trichloride catalyst component was prepared in a 600 liter vessel equipped with pressure and temperature control, and a turbine agitator. A nitrogen atmosphere (<5 ppm H$_2$O) was maintained at all times.

Four hundred sixty liters (460 l) of anhydrous tetrahydrofuran (<40 ppm H$_2$O) were added to the vessel, followed by 18.7 kgs of anhydrous (<100 ppm H$_2$O) magnesium dichloride (196 mols) and 7.67 kgs of TiCl$_3 \cdot \frac{1}{3}$AlCl$_3$ (3805 mols of TiCl$_3$). The mixture was agitated and heated at 60° C. for two hours and then at 30°–40° C. for four hours in order to dissolve the magnesium and titanium compounds. The mixture was then filtered through a 100 μm filter to remove undissolved magnesium dichloride (<40.5%).

(b) Spray Drying of TiCl$_3$ Catalyst Component

The solution prepared in accordance with Example 1(a) was slowly added to 27 kilograms (27 kgs) of fumed silica having a particle size in the range of from 0.1 μm to 1 μm (CAB-O-SIL® TS-610, manufactured by the Cabot Corporation). The mixture was stirred for two hours at ambient temperature by means of a helical ribbon agitator to thoroughly disperse the silica in the solution. A nitrogen atmosphere (<5 ppm H$_2$O) was maintained at all times.

The resulting solution was spray dried using an 8 foot diameter closed cycle spray dryer equipped with a rotary atomizer. The rotary atomizer was adjusted to give catalyst particles with a D50 of 15 μm. The scrubber section of the spray dryer was maintained at approximately 0° C.

Nitrogen gas was introduced into the spray dryer at an inlet temperature of 105° C. and was circulated at a rate of approximately 1100 kg/hour. The catalyst slurry was fed to the spray dryer at a temperature of about 35° C. and a rate of 78 kg/hour, or sufficient to yield an outlet gas temperature of approximately 65° C. The atomization pressure was slightly above atmospheric.

The spray dried catalyst contained 2.0 wt. % Ti, 5.7 wt. % Mg and 32.7 wt. % THF. The particles had a D10 of 6 μm, a D50 of 15 μm, and a D90 of 38 μm, as determined by means of a Leeds and Northrup Microtrac particle size analyzer using a dodecane solvent.

(c) Partial Activation of TiCl$_3$ Catalyst Component

The discrete catalyst particles prepared in accordance with Comparative Example 1(b) were mixed with mineral oil under a nitrogen atmosphere in a 400 liter vessel equipped with a turbine agitator to form a slurry containing approximately 28 weight percent of the solid catalyst component. A 30 weight percent solution of diethylaluminum chloride in mineral oil was added and the slurry was stirred for one hour. The diethylaluminum chloride solution was employed in an amount sufficient to provide 0.5 mols of this compound per mol of tetrahydrofuran in the catalyst. A 50 weight percent solution of tri-n-hexylaluminum in mineral oil was then added and the slurry was stirred for another two hours. The tri-n-hexylaluminum solution was employed in an amount sufficient to provide 0.2 mols of this compound per mol of tetrahydrofuran in the catalyst.

(d) Copolymerization of Ethylene with Hexene-1

The catalyst slurry prepared as described in Comparative Example 1(c) was employed together with triethylaluminum, as cocatalyst, to copolymerize ethylene with hexene-1 in a large fluid bed reactor system similar to that described and illustrated in U.S. Pat. Nos. 4,302,565, 4,302,566 and 4,303,771.

The catalyst slurry was continually fed to the polymerization reactor along with a 10 percent by weight solution of the cocatalyst in isopentane.

Hydrogen was added to the reactor as a chain transfer agent to regulate the molecular weight of the polymer produced. Nitrogen was added as a diluent gas.

Table I below summarizes the reaction conditions employed during polymerization, the properties of the polymers produced, and the productivity of the catalyst system.

TABLE I

|  | EXAMPLE 1 | COMPARATIVE EXAMPLE 1 |
|---|---|---|
| Polymization Conditions |  |  |
| Temperature, °C. | 88 | 86 |
| Total Pressure, kPa | 2150 | 1960 |
| Al Feed Rate, g. atoms/hour | 11.35 | 4.64 |
| Ti Feed Rate, g. atoms/hour | 0.29 | 0.13 |
| Al/Ti Atomic Ratio | 39 | 36 |
| Ethylene, Mol % | 29.03 | 30.57 |
| Hexene, Mol % | 4.23 | 4.21 |
| Nitrogen, Mol % | 56.53 | 48.80 |
| Hydrogen, Mol % | 4.33 | 4.74 |
| Isopentane, Mol % | — | 5.81 |
| Hexene/Ethylene Mol Ratio | 0.146 | 0.138 |
| Hydrogen/Ethylene Mol Ratio | 0.149 | 0.155 |
| Residence Time, hours | 2.7 | 4.0 |
| Gas Velocity, m/sec | 0.68 | 0.73 |
| Polymer Properties |  |  |
| Density, g/cm$^3$ | 0.918 | 0.918 |
| Melt Index, g/10 min. | 0.98 | 0.98 |
| Flow Index, g/10 min. | 26.7 | 28.2 |
| Melt Flow Ratio | 27.2 | 28.8 |
| n-Hexane Extractables, wt. % | 1.5 | 3.1 |
| Productivity |  |  |
| Kgs Polymer/hour | 10555 | 3470 |
| Ti, ppm | 1.3 | 0.8 |

We claim:
1. A catalyst system comprising
   (a) an organoaluminum component, and
   (b) a titanium trichloride component prepared by (i) reducing titanium tetrachloride with magnesium metal by treating titanium tetrachloride in an electron donor solvent with a stoichiometric amount of magnesium metal required to reduce said titanium tetrachloride to titanium trichloride and produce magnesium dichloride, said electron donor solvent being free of radicals containing active hydrogen; (ii) adding additional magnesium dichloride to the resulting solution to increase the Mg/Ti ratio to a range of from 1:1 to 56:1; and then (iii) impregnat- ing said solution in a suitable support or, alternatively, spray drying the solution with or without a suitable filler, to obtain discrete particles of catalyst.

2. A catalyst system as in claim 1 wherein the magnesium metal is in granular form and has an average particle size of from about 0.25 mm to about 10 mm.

3. A catalyst system as in claim 2 wherein the electron donor is tetrahydrofuran.

4. A catalyst system as in claim 2 wherein sufficient magnesium dichloride is added to the solution to increase the Mg/Ti ratio to a range of from 1.5:1 to 10:1 and the solution is impregnated in a silica support.

5. A catalyst system as in claim 4 wherein the electron donor is tetrahydrofuran.

6. A catalyst system as in claim 2 wherein sufficient magnesium dichloride is added to the solution to increase the Mg/Ti ratio to a range of from 1.5:1 to 15:1 and the solution is spray dried using fumed hydrophobic silica as a filler.

7. A catalyst system as in claim 6 wherein the electron donor is tetrahydrofuran.

8. A catalyst system as in claim 2 wherein reduction of titanium tetrachloride to titanium trichloride is effected by adding the titanium tetrachloride to a mixture of the magnesium metal and the electron donor.

9. A catalyst system as in claim 8 wherein the electron donor is tetrahydrofuran.

10. A catalyst system as in claim 2 wherein reduction of titanium tetrachloride to titanium trichloride is effected by adding the magnesium metal to a solution of the titanium tetrachloride in the electron donor.

11. A catalyst system as in claim 10 wherein the electron donor is tetrahydrofuran.

12. A catalyst system as in claim 10 wherein the magnesium dichloride is dissolved in the electron donor before the magnesium metal is added.

13. A catalyst system as in claim 12 wherein the electron donor is tetrahydrofuran.

14. A catalyst system as in claim 8 wherein sufficient magnesium dichloride is added to the solution to increase the Mg/Ti ratio to a range of from 1.5:1 to 10:1 and the solution is impregnated in a silica support.

15. A catalyst system as in claim 14 wherein the electron donor is tetrahydrofuran.

16. A catalyst system as in claim 8 wherein sufficient magnesium dichloride is added to the solution to increase the Mg/Ti ratio to a range of from 1.5:1 to 15:1 and the solution is spray dried using fumed hydrophobic silica as a filler.

17. A catalyst system as in claim 16 wherein the electron donor is tetrahydrofuran.

18. A catalyst system as in claim 10 wherein sufficient magnesium dichloride is added to the solution to increase the Mg/Ti ratio to a range of from 1.5:1 to 10:1 and the solution is impregnated in a silica support.

19. A catalyst system as in claim 18 wherein the electron donor is tetrahydrofuran.

20. A catalyst system as in claim 10 wherein sufficient magnesium dichloride is added to the solution to increase the Mg/Ti ratio to a range of from 1.5:1 to 15:1 and the solution is spray dried using fumed hydrophobic silica as a filler.

21. A catalyst system as in claim 20 wherein the electron donor is tetrahydrofuran.

22. A catalyst system as in claim 4 wherein the impregnated titanium trichloride component is slurried in a hydrocarbon solvent and partially activated with an organoaluminum compound.

23. A catalyst system as in claim 22 wherein the electron donor is tetrahydrofuran.

24. A catalyst system as in claim 6 wherein the spray dried titanium trichloride component is slurried in a hydrocarbon solvent and partially activated with an organoaluminum component.

25. A catalyst system as in claim 24 wherein the electron donor is tetrahydrofuran.

26. A process for producing a titanium trichloride composition suitable for use as a component of a Ziegler-Natta catalyst system which comprises (i) reducing titanium tetrachloride to titanium trichloride by treating titanium tetrachloride in an electron donor solvent with a stoichiometric amount of magnesium metal required to reduce said titanium tetrachloride to titanium trichloride and produce magnesium dichloride; (ii) adding additional magnesium dichloride to the resulting solution to increase the Mg/Ti ratio to a range of from 1:1 to 56:1; and then (iii) impregnating said solution in a suitable support or, alternatively, spray drying the solution with or without a suitable filler, to obtain discrete particles of catalyst.

* * * * *

UNITED STATES PATENT AND TRADEMARK OFFICE
CERTIFICATE OF CORRECTION

PATENT NO. : 5,290,745

DATED : March 1, 1994

INVENTOR(S) : R. J. Jorgensen, et al.

It is certified that error appears in the above-identified patent and that said Letters Patent is hereby corrected as shown below:

Column 6, line 31, "d + e + f + 3" should read --d + e + f = 3--.

Column 6, line 57, "80'C" should read --80 °C--.

Signed and Sealed this

Nineteenth Day of July, 1994

*Attest:*

BRUCE LEHMAN

*Attesting Officer*     *Commissioner of Patents and Trademarks*